No. 719,511. PATENTED FEB. 3, 1903.
H. J. SAGE.
MANUFACTURE OF GLASS TILE.
APPLICATION FILED MAY 21, 1900.
NO MODEL.
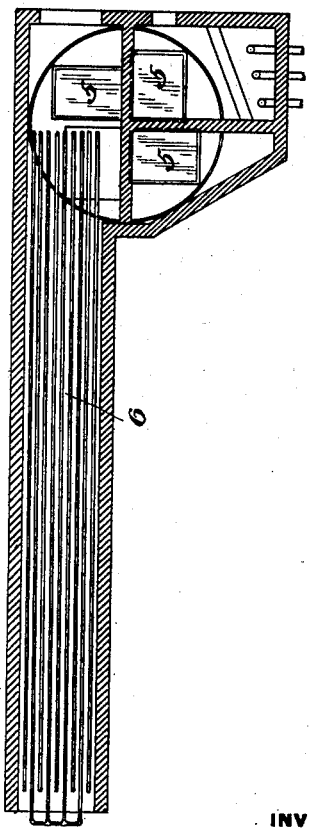
WITNESSES
INVENTOR
Henry J. Sage
by his Attorneys
Bakewell & Bakewell

UNITED STATES PATENT OFFICE.

HENRY J. SAGE, OF BEAVER, PENNSYLVANIA, ASSIGNOR TO OPALITE TILE COMPANY, OF PITTSBURG, PENNSYLVANIA, A CORPORATION OF PENNSYLVANIA.

MANUFACTURE OF GLASS TILE.

SPECIFICATION forming part of Letters Patent No. 719,511, dated February 3, 1903.

Application filed May 21, 1900. Serial No. 17,339. (No model.)

*To all whom it may concern:*

Be it known that I, HENRY J. SAGE, of Beaver, in the county of Beaver and State of Pennsylvania, have invented a new and useful Improvement in the Manufacture of Glass Tile, of which the following is a full, clear, and exact description, reference being had to the accompanying drawing, forming part of this specification, in which the figure is a plan view partly in longitudinal section.

In the manufacture of tile from glass great difficulty has been experienced in producing tiles of uniform thickness and uniform color, slight differences in these respects between different tiles producing serious results, because when the tiles are set in position on the wall or other surface to which they are applied they will not match and their appearance is to that extent impaired. Much labor and expense have been devoted to overcoming these difficulties, which I believe I have for the first time overcome in a satisfactory manner.

In the manufacture of my improved tile I proceed by rolling a sheet of opal or colored glass upon a rolling-table, reducing it throughout to a standard thickness. I then take the tile so rolled and place it on a flattening-stone and fire-polish it by passing flame over it and rubbing its surface with a wooden block and thence pass it through a leer, by which operations the sheet is flattened and annealed. Broken glass, sand, or other backing and a flux are then applied to the glass sheet, which sheet is again preferably introduced into an oven on a flattening-stone and heated, so as to fuse the backing material and cause it to adhere firmly to the glass. The glass is then again passed through the leer and finally annealed, after which it is cut to the desired dimensions. The result is that I obtain tiles which are of uniform thickness and also of uniform color, for I have found that the manner of heating and manipulation has much to do with the color of the glass and that when glass is blown or pressed it is very difficult to get all parts of it of the same shade.

In the drawings, 2 represents the table on which the sheet of glass is rolled and which is provided with a roller 3 and with strips or guides 4, forming an adjustable gage adapting the roller to be adjusted to roll uniform sheets of glass of any desired thickness. After the glass has been rolled on this table it is placed on a flattening-stone 5, where it is heated and polished by passing flame over it and rubbing its surface with a wooden block. I then pass it through a long tunnel or leer 6, where it is gradually cooled and annealed. A backing of sand, broken glass, or like material and a glass-flux are then applied to the glass. It is placed again in the flattening-oven or in another oven and is heated, and when the flux is fused it is again passed through the leer. These operations of flattening and heating the glass intensify the color, and as the thermal conditions to which the different sheets are subjected are the same uniform glass tiles of the same color and shape can easily be produced.

Where it is desired to produce tile having a patterned surface, I may form on the surface of the rolling-table a pattern which will be reproduced on the bottom of the glass sheet. I then apply the backing and flux to the top of the hot glass sheet and immediately place it in the flattening-oven, where it is simultaneously flattened and the flux fused. It is then annealed. In this operation the fire-polishing is omitted.

I claim—

1. An improvement in the manufacture of glass tile, which consists in rolling a sheet of opal or colored glass of predetermined thickness, annealing the same, applying a backing thereto with a suitable flux, reheating and melting said flux, and then reannealing the glass; substantially as described.

2. An improvement in the manufacture of glass tile, which consists in rolling a sheet of opal or colored glass of predetermined thickness, fire-polishing, and annealing the same, applying a backing thereto with a suitable flux, reheating and melting said flux, and then reannealing the glass; substantially as described.

3. An improvement in the manufacture of glass tile, which consists in rolling a sheet of opal or colored glass to a predetermined thickness, applying a backing and a flux thereto while the glass is still hot, then heating the sheet to flux the backing and then annealing the same; substantially as described.

In testimony whereof I have hereunto set my hand.

HENRY J. SAGE.

Witnesses:
THOMAS W. BAKEWELL,
H. M. CORWIN.